(12) United States Patent
Barbosa et al.

(10) Patent No.: US 9,621,070 B2
(45) Date of Patent: *Apr. 11, 2017

(54) POWER SUPPLY WITH MULTIPLE CONVERTERS AND AVERAGED FEEDFORWARD CONTROL

(71) Applicant: DELTA ELECTRONICS, INC., Taoyuan (TW)

(72) Inventors: Peter Barbosa, Taoyuan (TW); Brian Irving, Research Triangle Park, NC (US); Chih-Chiang Chan, Taoyuan (TW); Yu-Ming Chang, Taoyuan (TW); Milan M. Jovanovic, Research Triangle Park, NC (US)

(73) Assignee: DELTA ELECTRONICS, INC. (TW)

( * ) Notice: Subject to any disclaimer, the term of this patent is extended or adjusted under 35 U.S.C. 154(b) by 51 days.

This patent is subject to a terminal disclaimer.

(21) Appl. No.: 14/797,963

(22) Filed: Jul. 13, 2015

(65) Prior Publication Data

US 2016/0079881 A1 Mar. 17, 2016

Related U.S. Application Data

(63) Continuation-in-part of application No. 14/488,646, filed on Sep. 17, 2014, now Pat. No. 9,331,579.

(51) Int. Cl.
*H02M 7/23* (2006.01)
*H02M 7/49* (2007.01)
*H02M 1/00* (2006.01)

(52) U.S. Cl.
CPC .............. *H02M 7/23* (2013.01); *H02M 7/49* (2013.01); *H02M 2001/0003* (2013.01); *H02M 2001/0074* (2013.01)

(58) Field of Classification Search
CPC ............................. H02M 7/2176; H02M 7/23
See application file for complete search history.

(56) References Cited

U.S. PATENT DOCUMENTS 5,465,202 A * 11/1995 Ibori ..................... H02H 3/247
363/34
8,542,509 B2   9/2013 Sagneri et al.
(Continued)

FOREIGN PATENT DOCUMENTS

CN      101860228      10/2010
JP      11-004579       1/1999
(Continued)

OTHER PUBLICATIONS

H. Akagi and R. Kitada, "Control and Design of a Modular Multilevel Cascade BTB System Using Bidirectional Isolated DC/DC Converters," in IEEE Transactions on Power Electronics, vol. 26, No. 9, pp. 2457-2464, Sep. 2011. doi: 10.1109/TPEL.2011. 2107752.*

(Continued)

*Primary Examiner* — Harry Behm
*Assistant Examiner* — Peter Novak
(74) *Attorney, Agent, or Firm* — Hauptman Ham, LLP

(57) ABSTRACT

A power supply includes power modules. Each of the power modules includes an input stage and an output stage. The input stage generates an intermediate voltage, and the output stage outputs a DC supply voltage according to the intermediate voltage. The input stages are controlled with at least one first common control signal having a common duty cycle, and the output stages are controlled with at least one second common control signal having a common duty cycle.

18 Claims, 6 Drawing Sheets

(56) References Cited

U.S. PATENT DOCUMENTS

| | | |
|---|---|---|
| 2008/0197825 A1 | 8/2008 | Siri |
| 2009/0206804 A1 | 8/2009 | Xu et al. |
| 2012/0007431 A1 | 1/2012 | Jang et al. |
| 2014/0153294 A1* | 6/2014 | Deboy ............. H02M 3/33569 363/21.04 |
| 2015/0029761 A1 | 1/2015 | Trinh et al. |

FOREIGN PATENT DOCUMENTS

| | | |
|---|---|---|
| JP | 2001-275346 | 10/2001 |
| JP | 2013-172494 | 9/2013 |
| JP | 2015-508277 | 3/2015 |
| TW | M372997 | 1/2010 |
| WO | WO2013124595 | 8/2013 |
| WO | WO2014056742 | 4/2014 |

OTHER PUBLICATIONS

Raja Ayyanar et al., "Active Input-Voltage and Load-Current Sharing in Input-Series and Output-Parallel Connected Modular DC-DC Converters Using Dynamic Input-Voltage Reference Scheme", IEEE Transactions on Power Electronics, vol. 19, No. 6, Nov. 2004, pp. 1462-1473.
Ramesh Giri et al., "Common-Duty-Ratio Control of Input-Series Connected Modular DC-DC Converters With Active Input Voltage and Load-Current Sharing", IEEE Transactions on Industry Applications, vol. 42, No. 4, Jul./Aug. 2006, pp. 1101-1111.
Tiefu Zhao et al., "Voltage and Power Balance Control for a Cascaded H-Bridge Converter-Based Solid-State Transformer", IEEE Transactions on Power Electronics, vol. 28, No. 4, Apr. 2013, pp. 1523-1532.

\* cited by examiner

POWER SUPPLY WITH MULTIPLE CONVERTERS AND AVERAGED FEEDFORWARD CONTROL

RELATED APPLICATIONS

This application is a continuation-in-part of U.S. application Ser. No. 14/488,646, filed Sep. 17, 2014, the disclosure of which is hereby incorporated by reference herein in its entirety.

BACKGROUND

Technical Field

The present disclosure relates to an electronic apparatus. More particularly, the present disclosure relates to a power supply.

Description of Related Art

Generally, applications requiring DC voltages to be supplied from high-voltage AC-to-DC converter systems can be realized by stacking low-voltage power modules. Compared to using a single power module designed to process a high voltage directly from a high-voltage AC input, stacking the low-voltage power modules can achieve a significant efficiency of supplying power.

However, the challenge for the aforementioned stacked configuration is the input voltage sharing in which each power module is able to operate within its input voltage range. In addition, for stacked power modules in an AC-to-DC converter system, regulation of DC output voltage is a challenge, and input current shaping that is required such that an input current is proportional to and in phase with an AC input voltage is also a challenge.

SUMMARY

An aspect of the present disclosure is related to a power supply. The power supply includes a plurality of power modules. Each of the plurality of power modules includes a first converter and a second converter. The first converter is configured to generate an intermediate voltage. The second converter is configured to output a DC supply voltage according to the intermediate voltage. The first converters in the plurality of power modules are configured to be commonly controlled according to an input current flowing through the plurality of power modules, and the intermediate voltages in the plurality of power modules. The second converters in the plurality of power modules are configured to be commonly controlled according to outputs of the plurality of power modules.

Another aspect of the present disclosure is related to a power supply. The power supply includes a plurality of power modules. Each of the plurality of power modules includes an input stage and an output stage, in which the input stage is configured to generate an intermediate voltage, and the output stage is configured to output a DC supply voltage according to the intermediate voltage. The input stages are configured to be controlled with at least one first common control signal having a common duty cycle, and the output stages are configured to be controlled with at least one second common control signal having a common duty cycle.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of various embodiments, with reference to the accompanying drawings as follows.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that in the present disclosure, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1:
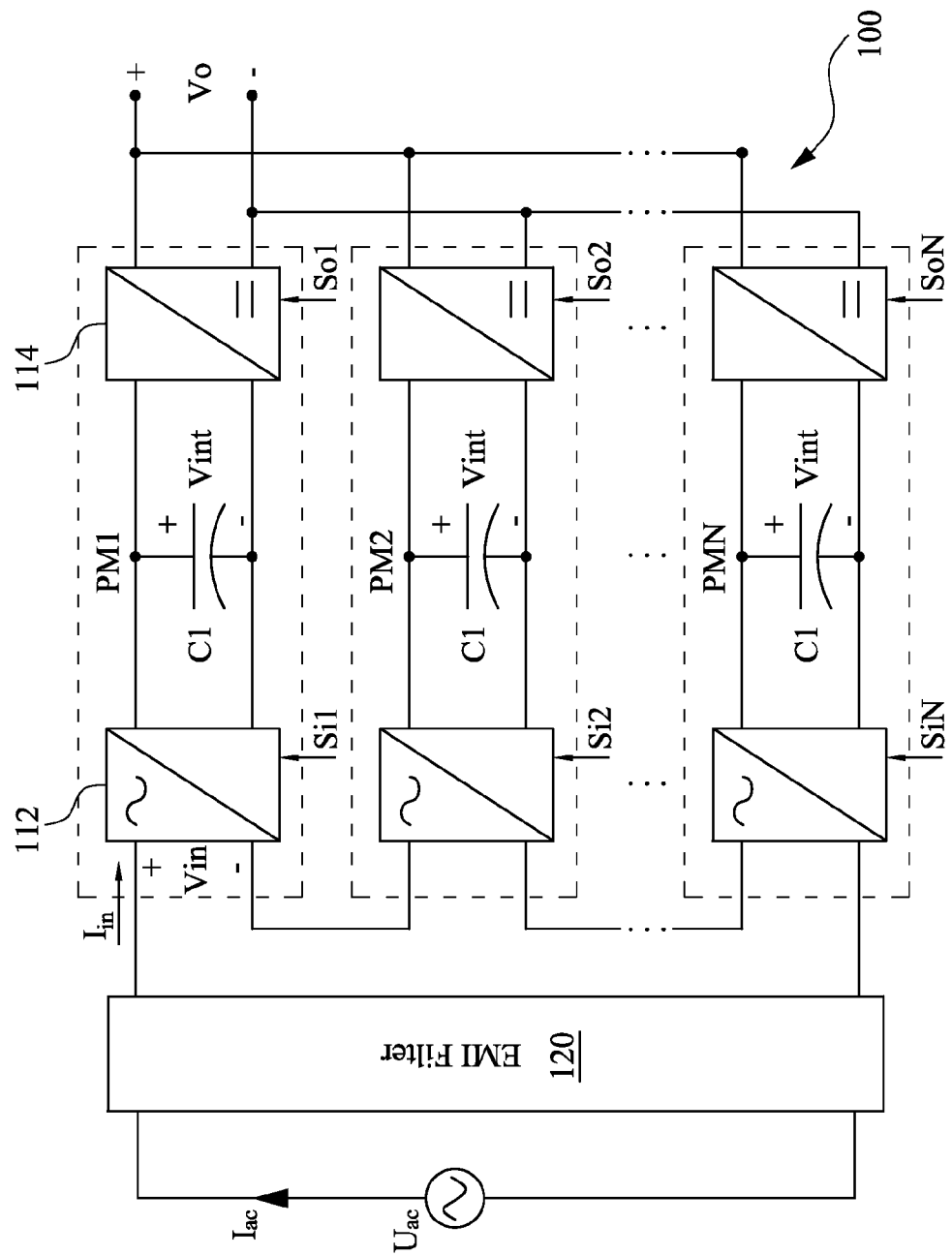
FIG. 1 is a schematic diagram of a power supply according to some embodiments of the present disclosure.

FIG. 1 is a schematic diagram of a power supply according to some embodiments of the present disclosure. As illustrated in FIG. 1, the power supply 100 includes power modules PM1-PMN (N>1), in which input terminals of the power modules PM1-PMN are electrically connected in series, and output terminals of the power modules PM1-PMN are electrically connected in parallel. In operation, the power modules PM1-PMN cooperate with each other to receive a power voltage Uac (e.g., AC power voltage) and output a DC supply voltage Vo.

Each one of the power modules PM1-PMN includes an input stage 112 and an output stage 114, in which the input stage 112 is cascade-connected to the output stage 114 such that the output stage 114 receives an output of the input stage 112. In each one of the power modules PM1-PMN, the input stage 112 is configured to convert an AC input voltage Vin into an intermediate voltage Vint (e.g., DC link voltage), and the output stage 114 is configured to output the DC supply voltage Vo according to the intermediate voltage Vint. In configuration, input terminals of the input stages 112 in the power modules PM1-PMN are electrically connected in series, and output terminals of the output stages 114 in the power modules PM1-PMN are electrically connected in parallel. In addition, the input stages 112 are configured to be controlled with common control signals Si1-SiN having a common duty cycle, and the output stages 114 are configured to be controlled with common control signal So1-SoN having a common duty cycle, so as to achieve power balance.

Illustratively, numbers of the power modules in the power supply 100 can be increased to increase power capability by arranging more power modules in parallel, while maintaining common control of the input stages and the output stages in the corresponding power modules.

In some embodiments, as illustrated in FIG. 1, the input stage 112 and the output stage 114 in each one of the power modules PM1-PMN are interfaced with a DC link capacitor C1, and the power supply 100 includes a EMI filter 120 electrically connected to input sides of the power modules PM1-PMN so as to attenuate differential and common mode noise. The EMI filter 120 also can be incorporated into each one of the power modules PM1-PMN. In such configuration, the power modules PM1-PMN of low voltage can cooperate with each other to process the power voltage Uac which is higher than 1000 Volts and output the DC supply voltage Vo.

In some embodiments, the input stage 112 in each one of the power modules PM1-PMN includes a converter (e.g., a AC-to-DC front-end converter), and the output stage 114 in each one of the power modules PM1-PMN includes a converter (e.g., a DC-to-DC converter). Moreover, the converters in the input stages 112 are configured to be commonly controlled according to the AC input voltages Vin, an input current Iin corresponding to the AC input voltages Vin and flowing through the power modules PM1-PMN, and the intermediate voltages Vint in the power modules PM1-PMN, and the converters in the output stages 114 are configured to be commonly controlled according to outputs of the power modules PM1-PMN. In some embodiments, the converters in the output stages 114 are configured to be commonly controlled according to the DC supply voltage Vo, and in various embodiments, the converters in the output stages 114 are configured to be commonly controlled according to an output current, or an output power, corresponding to the DC supply voltage Vo.

In practice, the converter in the input stage 112 can be a power factor correction (PFC) converter for performing input current shaping such that the input current Iin is proportional to and in phase with the power voltage Uac.

An operational scheme for the power modules PM1-PMN is exemplarily illustrated below. In operation, when the AC input voltage Vin of the power module PM1 increases momentarily as compared to those of the power modules PM2-PMN, the AC input voltages Vin of the remaining power modules PM2-PMN decrease such that a sum of all AC input voltages is equal to a total AC input voltage. In such condition, since the input current Iin is common to all of the power modules PM1-PMN, the input power of the power module PM1 increases accordingly, and the input power of the remaining power modules PM2-PMN decrease correspondingly, which in turn results in an increase of the intermediate voltage Vint (e.g., DC link voltage) of the power module PM1 and a subsequent decrease of the intermediate voltages Vint (e.g., DC link voltage) of the remaining power modules PM2-PMN. An increased intermediate voltage Vint results in an increased current delivered to a load associated with the power module PM1, and a corresponding decrease of the current delivered to loads associated with the remaining power modules PM2-PMN.

By employing the common control signals having a common duty cycle, no action is required to reduce mismatch between the intermediate voltages Vint or DC-to-DC output currents. Instead, since power delivered to the load associated with the power module PM1 is increased, the AC input voltage of the power module PM1 will then decrease naturally because the effective load for the power module PM1 has increased. Furthermore, since power delivered to the loads associated with the remaining power modules PM2-PMN is also decreased, the AC input voltages to the remaining power modules PM2-PMN will then tend to increase because the effective loads for the remaining power modules PM2-PMN have decreased. As a result, by preventing both the input stage and the output stage from responding to an initial mismatch between the power modules PM1-PMN, a natural balance between the power modules PM1-PMN can be obtained.

Figure 2:
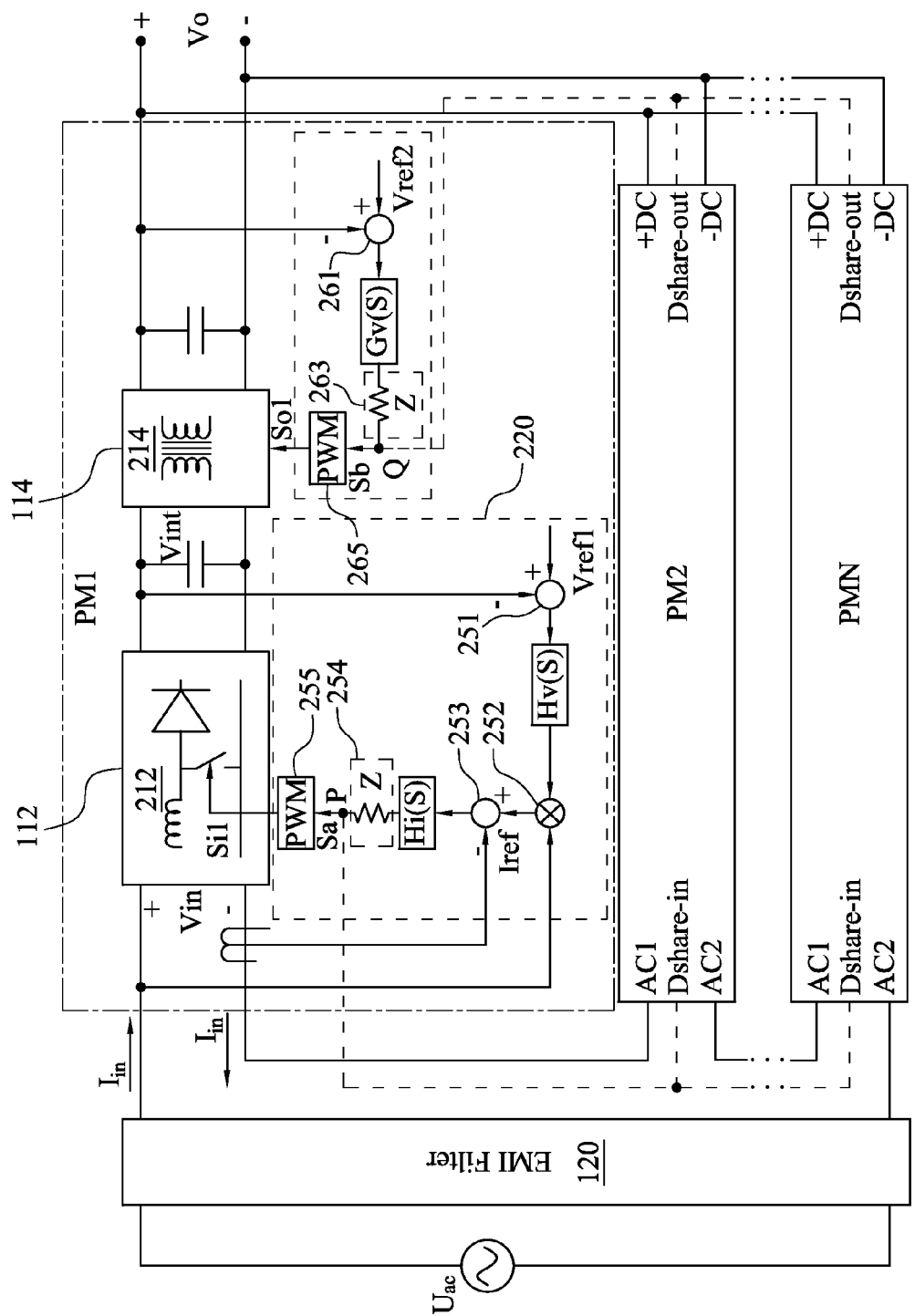
FIG. 2 is a schematic diagram of a power supply according to some other embodiments of the present disclosure.

FIG. 2 is a schematic diagram of a power supply according to some other embodiments of the present disclosure. As illustrated in FIG. 2, each one of the power modules PM1-PMN has its own set of control loops, in which the input stage 112 the output stage 114 have independent control loops. As illustrated in FIG. 2, each one of the power modules PM1-PMN can further include a controller 220, in which the controller 220 is configured to control the corresponding input stage 112 in response to the intermediate voltage Vint, the AC input voltage Vin, and the input current Iin corresponding to the AC input voltages Vin. Moreover, each one of the power modules PM1-PMN can further include a controller 240, in which the controller 240 is configured to control the corresponding output stage 114 in response to the DC supply voltage. For illustration in the power module PM1, the controller 220 is configured to generate the common control signal Sit for controlling the input stage 112, and the controller 240 is configured to generate the common control signal So1 for controlling the output stage 114.

In such configuration, the controllers 220 in the power modules PM1-PMN are configured to cooperate with each other to generate the common control signals Si1-SiN illustrated in FIG. 1, in response to the intermediate voltages Vint and the AC input voltages Vin in the power modules PM1-PMN, and the input current Iin corresponding to the AC input voltages Vin, and the controllers 240 in the power modules PM1-PMN are configured to cooperate with each other to generate the common control signals So1-SoN illustrated in FIG. 1, in response to the DC supply voltage Vo.

In some embodiments, each one of the input stages 112 in the power modules PM1-PMN includes a front-end converter 212 (e.g., PFC converter), and each one of the output stages 114 in the power modules PM1-PMN includes a DC-to-DC converter 214. The front-end converter 212 can be controlled to perform a DC link control of the intermediate voltage Vint and shape the input current Iin to follow a sinusoidal reference in phase with the AC input voltage Vin.

In such configuration, the controllers 220 in the power modules PM1-PMN cooperate with each other to commonly control the front-end converters 212 in the power modules PM1-PMN in response to the intermediate voltages Vint, the AC input voltages Vin and the input current Iin, and the controllers 240 in the power modules PM1-PMN cooperate with each other to commonly control the DC-to-DC converters 214 in the power modules PM1-PMN in response to the DC supply voltage Vo.

For illustration in the power module PM1, the controller 220 senses the intermediate voltage Vint, the AC input voltage Vin and the input current Iin, and outputs the common control signal Si1 accordingly. Specifically, in some embodiments, in the controller 220, a comparator 251 is configured to compare the sensed intermediate voltage Vint with a reference voltage Vref1 to generate a comparison result or an error signal. A voltage compensator Hv(s) is then configured to amplify the error signal. A multiplying circuit 252 is configured to multiply the output of the voltage compensator Hv(s) and the sensed AC input voltage Vin, in order to generate a reference current Iref. Afterwards, current shaping operation is performed, in which a comparator 253 is configured to compare the reference current Iref with the sensed input current Iin to generate a comparison result or an error signal, and the error signal from the comparator 253 is amplified by a current compensator Hi(s), such that the current compensator Hi(s) outputs an input control signal. An average circuit 254 is then configured to average the input control signal from the current compensator Hi(s) to generate a common signal. Thereafter, a pulse width modulation (PWM) circuit 255 is configured to output the common control signal Si1 according to the common signal from the average circuit 254. Configurations and operations of control loops for the front-end converters 212 in the power modules PM2-PMN are similar to those in the power module PM1, and thus they are not further detailed herein.

As illustrated in FIG. 2, the input current Iin is common to all of the power modules PM1-PMN, and all of the average circuits 254 in the power modules PM1-PMN are electrically connected in parallel for averaging input control signals to generate a common signal Sa for a simultaneous control of the front-end converters 212, such that the common control signals Si1-SiN outputted by the controllers 220 in the power modules PM1-PMN have a common duty cycle.

Since the input current Iin is common to all of the power modules PM1-PMN and the outputs of all current compensators Hi(s) are electrically connected together through the average circuits 254, the common control signals Si1-SiN that are configured for modulation can perform a common control of the front-end converters 212. As a result, interactions between the power modules PM1-PMN can be avoided.

In some embodiments, the average circuit 254 in each one of the power modules PM1-PMN includes an impedance circuit Z. In configuration, the impedance circuit Z in the power modules PM1-PMN are electrically connected in parallel at a node P. Since outputs of all current compensators Hi(s) can be averaged through the impedance circuit Z in the power modules PM1-PMN, the common signal Sa is thus generated.

On the other hand, for illustration in the power module PM1, the controller 240 senses the DC supply voltage and outputs the common control signal So1 accordingly. Specifically, in some embodiments, in the controller 240, a comparator 261 is configured to compare the sensed DC supply voltage Vo with a reference voltage Vref2 to generate a comparison result or an error signal. A compensator Gv(s) is then configured to amplify the error signal to output a feedback control signal. An average circuit 263 is then configured to average the input control signal from the compensator Gv(s) to generate a common signal. Thereafter, a pulse width modulation (PWM) circuit 265 is configured to output the common control signal So1 according to the common signal from the average circuit 263. Configurations and operations of control loops for the DC-to-DC converters 214 in the power modules PM2-PMN are similar to those in the power module PM1, and thus they are not further detailed herein.

As illustrated in FIG. 2, all of the average circuits 263 in the power modules PM1-PMN are electrically connected in parallel for averaging feedback control signals (from the compensators Gv(s)) to generate a common signal Sb for a simultaneous control of the DC-to-DC converters 214, such that the common control signals So1-SoN outputted by the controllers 240 in the power modules PM1-PMN have a common duty cycle.

In some embodiments, the average circuit 263 in each one of the power modules PM1-PMN includes an impedance circuit Z. In configuration, the impedance circuit Z in the power modules PM1-PMN are electrically connected in parallel at a node Q. Since outputs of all compensators Gv(s) can be averaged through the impedance circuit Z in the power modules PM1-PMN, the common signal Sb is thus generated.

In various embodiments, control of the front-end converters 212 and the DC-to-DC converters 214 in the power modules PM1-PMN can be performed with interleaving operations. Specifically, the front-end converters 212 in the power modules PM1-PMN can be switched in different enabling periods, such that the front-end converters 212 are controlled in a phase-shifting manner, and switching operations of the front-end converters 212 are interleaved. As a result, an effective frequency applied to the EMI filter 120 is multiple times the switching frequency of each front-end converter 212, which facilitates EMI filtering. Similarly, the DC-to-DC converters 214 in the power modules PM1-PMN can be switched in different enabling periods, such that the DC-to-DC converters 214 are controlled in a phase-shifting manner, and switching operations of the DC-to-DC converters 214 are interleaved. As a result, a similar effect of facilitating EMI filtering can be obtained.

In other various embodiments, multiple loops may be employed, as in the case of current-mode control, where both an output variable (e.g., the output voltage) and a DC-to-DC inductor current can be controlled simultaneously. In addition, various control manners may be employed as long as the duty cycle of the control signals for the front-end converters 212 or the DC-to-DC converters 214 is common to all of the power modules PM1-PMN.

In further embodiments, the aforementioned control manners even can be employed in a power supply which includes the power modules PM1-PMN and a number of redundant power modules, in which there are switches (not shown) configured in the power supply, and each of the switches is electrically connected at the input of one power module. In the event of a failure of any one of the power modules PM1-PMN, the corresponding one of the power modules PM1-PMN can be bypassed with the switch which is switched on, while the control of the failed power module is disabled, such that the remaining operating power modules have common control signals which do not contain information from the failed power module.

Configurations and operations of control loops illustrated in FIG. 2 are given for illustrative purposes. Various configurations and operations of control loops are within the contemplated scope of the present disclosure.

Based on the aforementioned embodiments, for the front-end converters 212, the input current Iin is common to all of the power modules PM1-PMN, while for the DC-to-DC converters 214, the DC supply voltage Vo is common to all of the power modules PM1-PMN. As a result, output voltage control, input voltage balance, input current shaping, intermediate voltage (e.g., DC-link voltage) control, and current sharing between modules, can all be accomplished. Accordingly, interactions between the controllers in the power modules can be avoided, and even interactions between the power modules can be avoided, so as to achieve power balance.

Figure 2A:
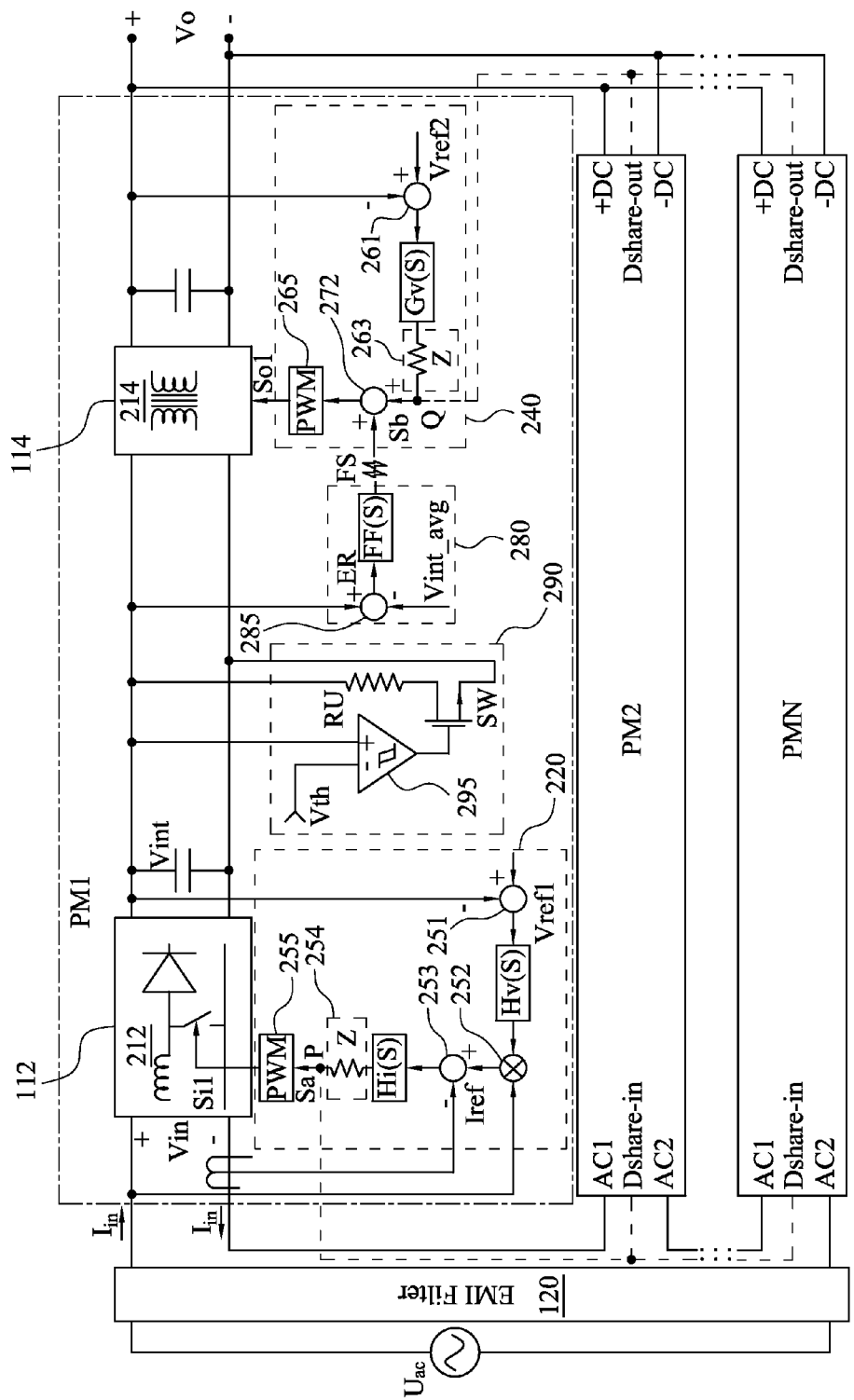
FIG. 2A is a schematic diagram of a power supply according to yet other embodiments of the present disclosure.

FIG. 2A is a schematic diagram of a power supply according to yet other embodiments of the present disclosure. Compared to FIG. 2, in various embodiments illustrated in FIG. 2A, each one of the power modules PM1-PMN further includes a feed-forward circuit 280. The feed-forward circuit 280 is electrically connected to the output of the front-end converter 212 to receive the respective intermediate voltage Vint. The feed-forward circuit 280 is configured to generate a feed-forward signal FS to be superimposed with the common signal Sb, according to the respective intermediate voltage Vint and an average of the intermediate voltages in the power modules PM1-PMN, i.e., an average intermediate voltage Vint_avg labeled in FIG. 2A. In such condition, the PWM circuit 265 outputs the common control signal So1 according to the superimposition of the feed-forward signal FS and the common signal Sb.

In some embodiments, each one of the power modules PM1-PMN further includes an adder 272, in which the adder 272 is configured to superimpose the feed-forward signal FS with the common signal Sb, and output the superimposition for the PWM circuit 265.

In some other embodiments, the feed-forward circuit 280 includes a comparator 285 and a compensator FF(s) having a transfer function. The comparator 285 is configured to compare the respective intermediate voltage Vint with the average intermediate voltage Vint_avg, to generate an error signal ER. The compensator FF(s) is configured to amplify the error signal ER to generate the feed-forward signal FS.

In operation, for illustration, if the respective intermediate voltage Vint in the power module PM1 increases faster than the other intermediate voltages Vint in the power modules PM2-PMN, the error between the respective intermediate voltage Vint and the average intermediate voltage Vint_avg will increase. The PWM circuit 265 modifies the common control signal So1 for controlling the DC-to-DC converter 214, such that an effective duty cycle of the power module PM1 also increases. Accordingly, more power is transferred through the power module PM1, forcing the respective intermediate voltage Vint in the power module PM1 to decrease. As a result, the feed-forward circuit 280 can help balance the intermediate voltages Vint in the power modules PM1-PMN.

Illustratively, the feed-forward circuit 280 is configured, in some embodiments, at the primary side of the DC-to-DC converter 214, and in some other embodiments, at the secondary side of the DC-to-DC converter 214. Moreover, in some embodiments, the feed-forward circuit 280 is isolated from the common signal Sb.

On the other hand, compared to FIG. 2, in various embodiments illustrated in FIG. 2A, each one of the power modules PM1-PMN further includes a bleeder circuit 290. The bleeder circuit 290 is electrically connected to the output of the front-end converter 212 to receive the respective intermediate voltage Vint. The bleeder circuit 290 is configured to dynamically modify the respective intermediate voltage Vint. Accordingly, in the condition that the power modules PM1-PMN are operated with very light loads or no load, the bleeder circuit 290 can be operated to emulate the same effect as which the feed-forward circuit 280 performs, as discussed above.

In some embodiments, the bleeder circuit 290 is an active bleeder circuit. In some other embodiments, the bleeder circuit 290 includes a comparator 295, a switch SW, and a resistor unit RU. The comparator 295 is configured to compare the respective intermediate voltage with a threshold voltage Vth to generate a comparison output. The switch SW is configured to be controlled by the comparison output, and electrically connected to one terminal of the output of the front-end converter 212. The resistor unit RU is electrically connected between the switch SW and the other terminal of the output of the front-end converter 212.

In various embodiments, the comparator 295 is a hysteresis comparator. In other various embodiments, the resistor unit RU includes one or more dummy load resistors.

For illustration with the comparator 295 being a hysteresis comparator, when the respective intermediate voltage Vint increases and is higher than the threshold voltage Vth plus a hysteresis pre-setting value, the switch SW is switched on. Accordingly, the resistor unit RU is connected, through the switch-on switch SW, between the two terminals of the output of the front-end converter 212, such that the resistor unit RU is operated to reduce the respective intermediate voltage Vint. On the other hand, when the respective intermediate voltage Vint decreases and is lower than the threshold voltage Vth minus a hysteresis pre-setting value, the switch SW is switched off and disconnects the resistor unit RU from one terminal of the output of the front-end converter 212. As discussed above, the bleeder circuit 290 can be operated to dynamically modify the respective intermediate voltage Vint. As a result, the bleeder circuit 290 can help balance the intermediate voltages Vint in the power modules PM1-PMN as well, even in the condition that the power modules PM1-PMN are operated with very light loads or no load.

In some embodiments, each one of the power modules PM1-PMN includes the feed-forward circuit 280 without the bleeder circuit 290. In some other embodiments, each one of the power modules PM1-PMN includes the bleeder circuit 290 without the feed-forward circuit 280. FIG. 2A is only given for illustrative purposes. Various configurations in FIG. 2A are within the contemplated scope of the present disclosure.

In various embodiments, each one of the power modules PM1-PMN includes both the feed-forward circuit 280 and the bleeder circuit 290. In such embodiments, the feed-forward circuit 280 and the bleeder circuit 290 can be operated together to improve the balance of the intermediate voltages Vint in the power modules PM1-PMN throughout entire load range.

Operations in the power modules PM2-PMN are similar to the operation in the power module PM1, as discussed above, and thus they are not further detailed herein.

Figure 3:
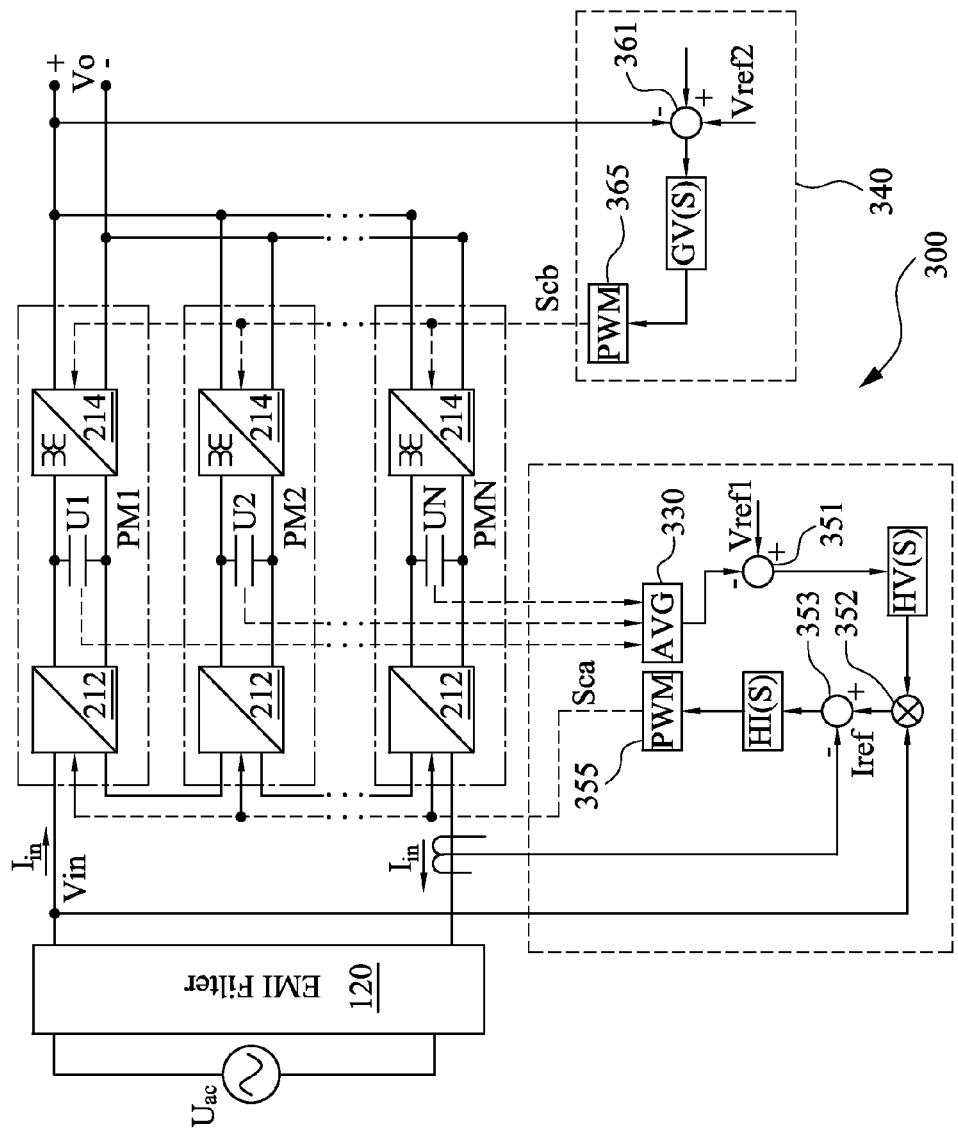
FIG. 3 is a schematic diagram of a power supply according to various embodiments of the present disclosure.

FIG. 3 is a schematic diagram of a power supply according to various embodiments of the present disclosure. As illustrated in FIG. 3, compared to the embodiments illustrated in FIG. 2, the power supply 300 includes a single controller 320 and a single controller 340, each of which, in some embodiments, is independent from the power modules PM1-PMN and implemented by a processor. The controller 320 is configured to average the intermediate voltages U1-UN generated in the power modules PM1-PMN, respectively, and configured to commonly control the front-end converters 212 in response to the intermediate voltages U1-UN, the AC input voltage Vin across the inputs of the power modules PM1-PMN, and the input current Iin. The controller 340 is configured to commonly control the DC-to-DC converters 214 in response to the DC supply voltage Vo. For illustration, the controller 320 is configured to generate a common control signal Sca for commonly controlling the front-end converters 212 in response to the intermediate voltages U1-UN, the AC input voltage Vin and the input current Iin, and the controller 340 is configured to generate a common control signal Scb for commonly controlling the DC-to-DC converters 214 in response to the DC supply voltage Vo.

In some embodiments, the controller 320 includes an averaging circuit 330 for averaging the intermediate voltages U1-UN, and an output of the averaging circuit 330 is inputted to the comparator 351, in which the configurations and operations of the comparators 351 and 353, the voltage compensator Hv(s), the multiplying circuit 352, the current compensator Hi(s) and the PWM circuit 355 are similar to those illustrated in FIG. 2, and thus they are not further detailed herein.

Moreover, in some embodiments, the controller 340 includes no averaging circuit (or impedance circuit) as illustrated in FIG. 2, and the configurations and operations of the comparator 361, the compensator Gv(s) and the PWM circuit 365 similar to those illustrated in FIG. 2, and thus they are not further detailed herein.

Figure 4:
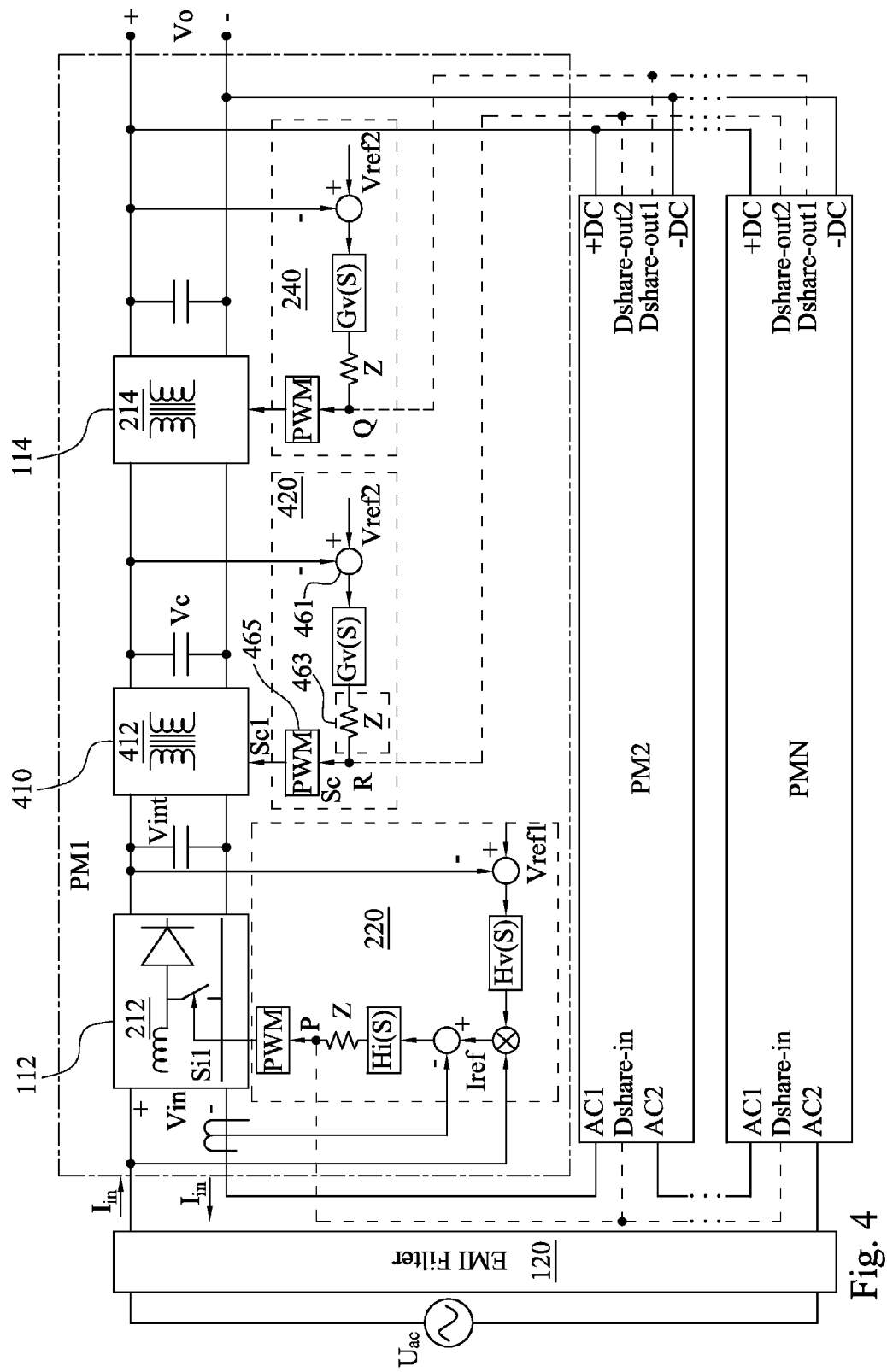
FIG. 4 is a schematic diagram of a power supply according to various embodiments of the present disclosure.

FIG. 4 is a schematic diagram of a power supply according to various embodiments of the present disclosure. As illustrated in FIG. 4, compared to the embodiments illustrated in FIG. 2, each one of the power modules PM1-PMN further includes at least one intermediate stage 410 cascade-connected between the input stage 112 and the output stage 114, and the intermediate stage 410 is configured to convert the intermediate voltage Vint into an DC output voltage Vc (e.g., DC link voltage) inputted to the output stage 114. The intermediate stages 410 in the power modules PM1-PMN are configured to be controlled with common control signals having a common duty cycle. For illustration in the power module PM1, the intermediate stage 410 is controlled with the common control signal Sc1.

In some embodiments, as illustrated in FIG. 4, each one of the power modules PM1-PMN can further include a controller 420, and the controller 420 is configured to control the corresponding intermediate stage 410 in response to the DC output voltage Vc. For illustration in the power module PM1, the controller 420 is configured to generate the common control signal Sc1 for controlling the intermediate stage 410. In such configuration, the controllers 420 in the power modules PM1-PMN are configured to cooperate with each other to generate the common control signals in response to the DC output voltages Vc in the power modules PM1-PMN.

In some embodiments, the intermediate stage 410 in each one of the power modules PM1-PMN includes a DC-to-DC converter 412, in which the DC-to-DC converter 412 is cascade-connected between the front-end converter 212 and the DC-to-DC converter 214, and configured to convert the intermediate voltage Vint into the DC output voltage Vc inputted to the DC-to-DC converter 214. In such configuration, the DC-to-DC converter 412 in the power modules PM1-PMN are configured to be commonly controlled in response to the DC output voltages Vc in the power modules PM1-PMN.

The DC-to-DC converter 412 (or the intermediate stage 410) in FIG. 4 is given for illustrative purposes. Various numbers and configurations of the DC-to-DC converter 412 (or the intermediate stage 410) are within the contemplated scope of the present disclosure.

In such configuration, the controllers 420 in the power modules PM1-PMN cooperate with each other to commonly control the DC-to-DC converters 412 in response to the DC output voltages Vc in the power modules PM1-PMN.

In further embodiments, the configuration and operation in the controller 420 are similar to those in the controller 240. Explained in a different way, the controller 420 may further include a comparator 461, a compensator Gv(s), an average circuit 463 and a PWM circuit 465, which are similar to those in the controller 240, and functions and operations thereof are also similar to those illustrated in FIG. 2. In such configuration, all of the average circuits 463 in the power modules PM1-PMN are electrically connected in parallel for averaging control signals (e.g., signals from the compensators Gv(s)) to generate a common signal Sc for a simultaneous control of the DC-to-DC converters 412, such that the common control signals outputted by the controllers 420 in the power modules PM1-PMN have a common duty cycle.

Similarly, in some embodiments, the average circuit 463 in each one of the power modules PM1-PMN includes an impedance circuit Z.

Configurations and operations of control loops illustrated in FIG. 4 are given for illustrative purposes. Various configurations and operations of control loops are within the contemplated scope of the present disclosure. In addition, the control loops in the power modules PM1-PMN illustrated in FIG. 4 are configured, in some embodiments, as a single controller which is independent from the power modules PM1-PMN and implemented by a processor, which is similar to that illustrated in FIG. 3.

Moreover, each one of the power modules PM1-PMN illustrated in FIG. 4 may further include the feed-forward circuit 280, the bleeder circuit 290, or the combination of the feed-forward circuit 280 and the bleeder circuit 290, as illustrated in FIG. 2A.

For the feed-forward circuit included in each one of the power modules PM1-PMN illustrated in FIG. 4, the feed-forward circuit may be configured and operated together with the controller 240 and the controller 420, which is similar to that illustrated in FIG. 2A, and thus it is not further detailed herein. In addition, for the bleeder circuit included in each one of the power modules PM1-PMN illustrated in FIG. 4, the bleeder circuit may be configured and operated similar to that illustrated in FIG. 2A, and thus it is not further detailed herein.

Figure 5:
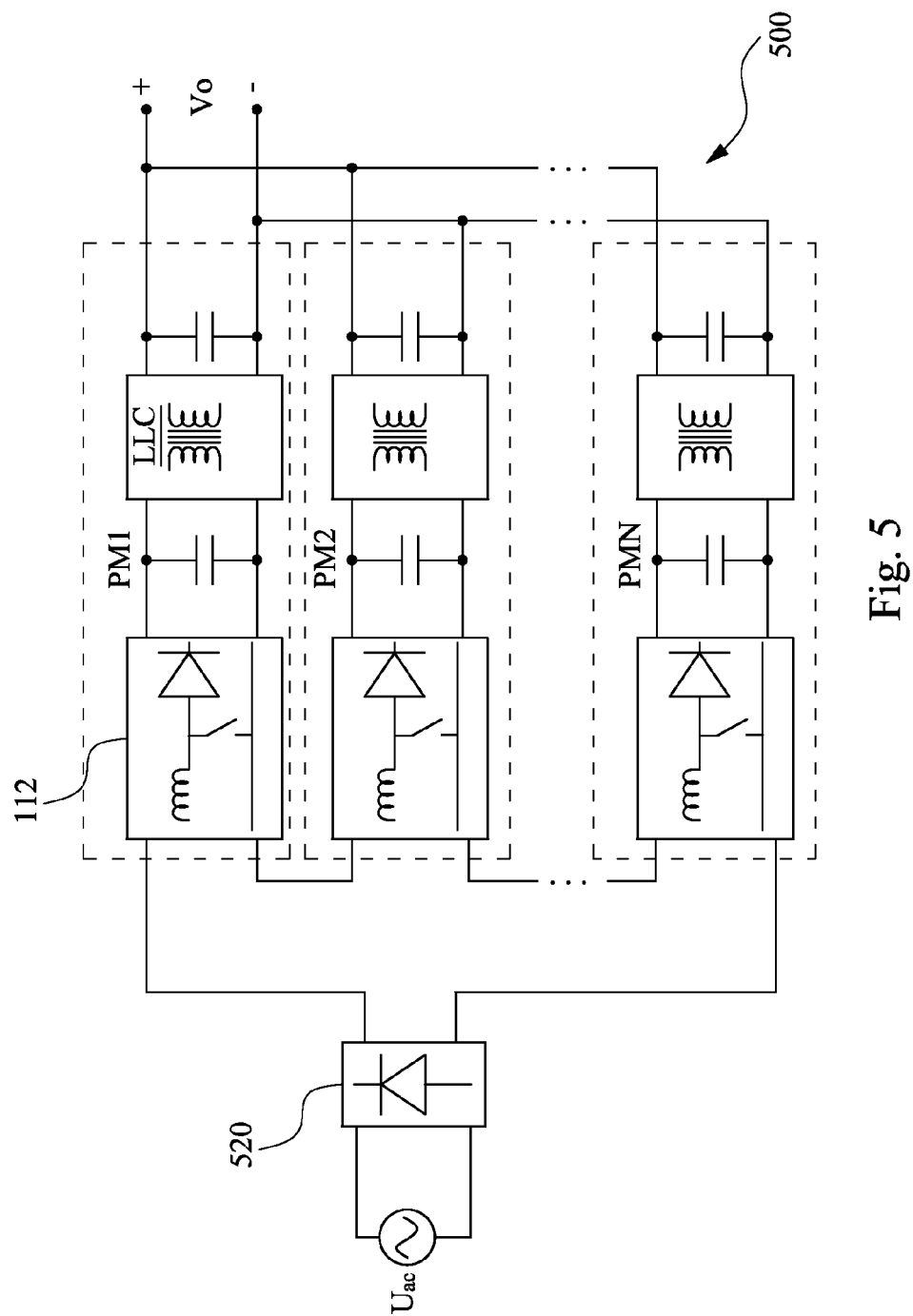
FIG. 5 is a schematic diagram of a power supply according to some other embodiments of the present disclosure.

FIG. 5 is a schematic diagram of a power supply according to some other embodiments of the present disclosure. Compared to the embodiments illustrated in FIG. 1, the power supply 500 in FIG. 5 includes an input diode bridge 520, and the input diode bridge 520 is electrically connected to the power modules PM1-PMN. The input diode bridge 520 is configured to rectify the power voltage Uac (e.g., AC power voltage) and generate a DC input voltage for the power modules PM1-PMN. Accordingly, in the condition that the input stages 112 in the power modules PM1-PMN are power factor correction (PFC) converters, input diodes of the PFC converters can be replaced by the input diode bridge 520.

Configurations and operations of the power modules PM1-PMN in FIG. 5 are similar to those illustrated in the embodiments of FIGS. 1-4, and thus they are not further detailed herein.

Another aspect of the present disclosure is related to a method of supplying power. For convenience of illustration, the method of supplying power is described below with reference to the embodiments in FIG. 1 and FIG. 2, but it is not limited thereto.

In one operation, the input stages 112 in the power modules PM1-PMN are commonly controlled to convert the AC input voltages Vin into the intermediate voltages Vint, respectively. Furthermore, in another operation, the output stages 114 in the power modules PM1-PMN are commonly controlled to generate the DC supply voltage Vo according to the intermediate voltages Vint.

In some embodiments, the operation of commonly controlling the input stages 112 includes commonly controlling the input stages 112 with at least one common control signal (e.g., the common control signals Si1-SiN) having a common duty cycle, in response to the intermediate voltages Vint, the AC input voltages Vin, and the input current Iin corresponding to the AC input voltages Vin.

In some other embodiments, the operation of commonly controlling the output stages 114 includes commonly controlling the output stages 114 with at least one common control signal (e.g., the common control signals So1-SoN) having a common duty cycle, in response to the DC supply voltage.

In further embodiments, with reference to FIG. 2, the method of supplying power further includes an operation of averaging input control signals (e.g., the signals from the current compensators Hi(s) in the power modules PM1-PMN) to generate the common signal Sa for a common control of the input stages 112, and an operation of averaging feedback control signals (e.g., the signals from the compensators Gv(s) in the power modules PM1-PMN) to generate the common signal Sb for a common control of the output stages 114.

Illustratively, the method of supplying power may be employed in a power module including multiple stages. For convenience of illustration, the method of supplying power is described below with reference to the embodiments in FIG. 4, but it is not limited thereto.

In some embodiments, the method of supplying power further includes commonly controlling the intermediate stages 410 in the power modules PM1-PMN to convert the intermediate voltages Vint into the DC output voltages Vc inputted to the output stages 114, respectively.

The operations are not necessarily recited in the sequence in which the steps are performed. That is, unless the sequence of the operations is expressly indicated, the sequence of the operations is interchangeable, and all or part of the operations may be simultaneously, partially simultaneously, or sequentially performed.

For the aforementioned embodiments, output voltage control, input voltage balance, input current shaping, intermediate voltage (e.g., DC-link voltage) control, and current sharing between modules, can all be accomplished. As a result, interactions between the power modules can be avoided, so as to achieve power balance.

As is understood by one of ordinary skill in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A power supply comprising:
a plurality of power modules, each of the plurality of power modules comprising:
a first converter configured to generate an intermediate voltage;
a second converter configured to output a DC supply voltage according to the intermediate voltage; and
a feed-forward circuit configured to generate a feed-forward signal to be superimposed with a first common signal, according to the respective intermediate voltage and an average of the intermediate voltages in the plurality of power modules;
wherein the first converters in the plurality of power modules are configured to be commonly controlled according to an input current flowing through the plurality of power modules, and the intermediate voltages in the plurality of power modules;
wherein the second converters in the plurality of power modules are configured to be commonly controlled according to outputs of the plurality of power modules, and the first common signal is for a simultaneous control of the second converters of the power modules.

2. The power supply as claimed in claim 1, wherein each of the plurality of power modules further comprises a first controller and a second controller;
wherein the first controllers in the plurality of power modules are configured to cooperate with each other to commonly control the first converters in response to the intermediate voltages in the plurality of power modules and the input current;
wherein the second controllers in the plurality of power modules are configured to cooperate with each other to commonly control the second converters in response to the DC supply voltage.

3. The power supply as claimed in claim 2, wherein each of the first controllers comprises an average circuit,
the average circuits in the plurality of power modules are electrically connected in parallel for averaging input control signals to generate a second common signal for a simultaneous control of the first converters, wherein the input control signals are generated in response to the intermediate voltages in the plurality of power modules, the input current, and input voltages corresponding to the input current and inputted into the plurality of power modules, respectively.

4. The power supply as claimed in claim 2, wherein each of the second controllers comprises an average circuit;
wherein the average circuits in the plurality of power modules are electrically connected in parallel for averaging feedback control signals to generate the first common signal, wherein the feedback control signals are generated in response to the DC supply voltage.

5. The power supply as claimed in claim 1, wherein the feed-forward circuit comprises:
a comparator configured to compare the respective intermediate voltage with the average of the intermediate voltages in the plurality of power modules, to generate an error signal; and
a compensator configured to amplify the error signal to generate the feed-forward signal.

6. The power supply as claimed in claim 1, wherein each of the plurality of power modules further comprises:
a bleeder circuit configured to dynamically modify the respective intermediate voltage.

7. The power supply as claimed in claim 1, wherein each of the plurality of power modules further comprises:
a bleeder circuit configured to dynamically modify the respective intermediate voltage.

8. The power supply as claimed in claim 7, wherein the bleeder circuit comprises:
a comparator configured to compare the respective intermediate voltage with a threshold voltage to generate a comparison output;
a switch configured to be controlled by the comparison output; and
a resistor unit electrically connected to the switch and configured to reduce the respective intermediate voltage when the switch is switched on.

9. The power supply as claimed in claim 1, wherein each of the plurality of power modules further comprises at least one third converter cascade-connected between the first converter and the second converter, and a third controller;
wherein the at least one third converter is configured to convert the intermediate voltage into a DC output voltage inputted to the second converter, the third converters in the plurality of power modules are configured to be commonly controlled according to the DC output voltages in the plurality of power modules, and the third controllers in the plurality of power modules are configured to cooperate with each other to commonly control the third converters in response to the DC output voltages in the plurality of power modules.

10. A power supply comprising:
a plurality of power modules, each of the plurality of power modules comprising an input stage, an output stage and a feed-forward circuit, the input stage configured to generate an intermediate voltage, the output stage configured to output a DC supply voltage according to the intermediate voltage, the feed-forward circuit configured to generate a feed-forward signal to be superimposed with a first common signal, according to the respective intermediate voltage and an average of the intermediate voltages in the plurality of power modules;
wherein the input stages are configured to be controlled with at least one first common control signal having a common duty cycle, and the output stages are configured to be controlled with at least one second common control signal having a common duty cycle.

11. The power supply as claimed in claim 10, wherein each of the plurality of power modules further comprises a controller;
wherein the controllers in the plurality of power modules are configured to cooperate with each other to generate the at least one first common control signal in response to the intermediate voltages in the plurality of power modules and an input current flowing through the plurality of power modules.

12. The power supply as claimed in claim 10, wherein each of the plurality of power modules further comprises a controller;
wherein the controllers in the plurality of power modules are configured to cooperate with each other to generate the at least one second common control signal in response to the DC supply voltage.

13. The power supply as claimed in claim 10, wherein each of the plurality of power modules further comprises a first impedance circuit and a second impedance circuit;
wherein the first impedance circuits in the plurality of power modules are electrically connected in parallel to generate a second common signal corresponding to the at least one first common control signal, in response to the intermediate voltages in the plurality of power modules and an input current flowing through the plurality of power modules;
wherein the second impedance circuits in the plurality of power modules are electrically connected in parallel to generate the first common signal corresponding to the at least one second common control signal, in response to the DC supply voltage.

14. The power supply as claimed in claim 10, wherein the feed-forward circuit comprises:
a comparator configured to compare the respective intermediate voltage with the average of the intermediate voltages in the plurality of power modules, to generate an error signal; and
a compensator configured to amplify the error signal to generate the feed-forward signal.

15. The power supply as claimed in claim 10, wherein each of the plurality of power modules further comprises:
a bleeder circuit configured to dynamically modify the respective intermediate voltage.

16. The power supply as claimed in claim 10, wherein each of the plurality of power modules further comprises:
a bleeder circuit configured to dynamically modify the respective intermediate voltage.

17. The power supply as claimed in claim 16, wherein the bleeder circuit comprises:
a comparator configured to compare the respective intermediate voltage with a threshold voltage to generate a comparison output;
a switch configured to be controlled by the comparison output; and
a resistor unit electrically connected to the switch and configured to reduce the respective intermediate voltage when the switch is switched on.

18. The power supply as claimed in claim 10, wherein each of the plurality of power modules further comprises at least one intermediate stage cascade-connected between the input stage and the output stage, and a controller;
wherein the at least one intermediate stage is configured to convert the intermediate voltage into a DC output voltage inputted to the output stage, the intermediate stages in the plurality of power modules are configured to be controlled with at least one third common control signal having a common duty cycle, and the controllers in the plurality of power modules are configured to cooperate with each other to generate the at least one third common control signal in response to the DC output voltages in the plurality of power modules.

\* \* \* \* \*